(12) United States Patent
Fukushima et al.

(10) Patent No.: US 8,536,291 B2
(45) Date of Patent: Sep. 17, 2013

(54) HYDROGEL COMPOSITIONS AND METHODS OF PREPARATION THEREOF

(75) Inventors: Kazuki Fukushima, San Jose, CA (US);
James L. Hedrick, San Jose, CA (US);
Sung-Ho Kim, Livermore, CA (US);
Robert M. Waymouth, Palo Alto, CA (US)

(73) Assignees: International Business Machines Corporation, Armonk, NY (US); The Board of Trustees of the Leland Standford Junior University, Palo Alto, CA (US)

( * ) Notice: Subject to any disclaimer, the term of this patent is extended or adjusted under 35 U.S.C. 154(b) by 0 days.

(21) Appl. No.: 13/543,120

(22) Filed: Jul. 6, 2012

(65) Prior Publication Data

US 2012/0322949 A1    Dec. 20, 2012

Related U.S. Application Data

(62) Division of application No. 12/549,667, filed on Aug. 28, 2009, now Pat. No. 8,263,715.

(51) Int. Cl.
*C08G 64/18* (2006.01)

(52) U.S. Cl.
USPC ........... 526/269; 525/410; 525/411; 525/413; 525/415; 528/370

(58) Field of Classification Search
USPC ................. 525/415, 410, 411, 413; 526/269; 528/370
See application file for complete search history.

(56) References Cited

U.S. PATENT DOCUMENTS

| | | | |
|---|---|---|---|
| 6,646,100 | B2 | 11/2003 | Hofmann et al. |
| 2004/0044174 | A1 | 3/2004 | Hofmann et al. |
| 2006/0241201 | A1 | 10/2006 | Grijpma et al. |
| 2007/0009582 | A1 | 1/2007 | Madsen et al. |
| 2008/0248126 | A1 | 10/2008 | Cheng et al. |
| 2011/0150977 | A1 | 6/2011 | Hedrick et al. |

OTHER PUBLICATIONS

Lutz, Jean-Francois, et al., "Point by Point Comparison of Two Thermosensitive Polymers Exhibiting a Similar LCST: Is the Age of Ply(NIPAM) Over?", J. Am. Chem. Soc. 2006, vol. 128, No. 40, dated Sep. 16, 2006, pp. 13046-13047.

Lutz, Jean-Francois et al., "Notes—Preparation of Ideal PEG Analogues with a Tunable Thermosensitivity by Controlled Radical Copolymerization of 2-(2-Methoxyethoxy)ethyl Methacrylate and Oligo(ethylene glycol) Methacrylate", American Chemical Society, 2006, Macromolecules 2006, vol. 39, pp. 893-896.

Pratt, et al; Tagging Alcohols for Cyclic Carbonate: A Versatile Equvalent of Meth(Acrylate for Ring-Opening) Ploymerization. Chem Communication (2008); 114-116, 3 pages.

*Primary Examiner* — Mark Kaucher
(74) *Attorney, Agent, or Firm* — Cantor Colburn LLP

(57) ABSTRACT

Block copolymers include hydrophobic and hydrophilic blocks having repeating units derived from ring opening polymerization of one or more cyclic carbonate monomers. The carbonate monomers are independently selected from compounds of formula (II):

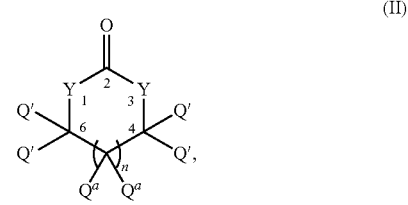

(II)

wherein each Q' and $Q^a$ group independently represents a hydrogen, an alkyl group, a halide, a carboxy group, an ester group, an amide group, an aryl group, an alkoxy group, or a foregoing Q' or $Q^a$ group substituted with a carboxy group or an ester group, at least one Q' and $Q^a$ group includes an ester group; each Y independently represents O, S, NH, or NQ"; n is an integer from 0 to 6, wherein when n is 0, carbons labeled 4 and 6 are linked together by a single bond; each Q" group independently represents an alkyl group, an aryl group, or a foregoing Q" group substituted with a carboxy group, or an ester group.

5 Claims, 4 Drawing Sheets

HYDROGEL COMPOSITIONS AND METHODS OF PREPARATION THEREOF

CROSS REFERENCE TO RELATED APPLICATIONS

This application is a divisional application of and claims priority to U.S. application Ser. No. 12/549,667, filed on Aug. 28, 2009, incorporated herein by reference in its entirety.

BACKGROUND

The present invention relates to hydrogel compositions and methods of preparation thereof.

Injectable polymeric hydrogels have been explored as an artificial extracellular matrix (ECM) for drug delivery and tissue remodeling/healing. These materials are attractive because of their colloidal properties in water.

Three general strategies exist for preparing injectable hydrogels. The first is based on physical interactions between polymer chains; the second strategy relies on an in situ synthesis, usually based on Michael addition chemistry; and the third strategy is based on thermoresponsive polymers. The thermoresponsive hydrogel materials are used in a variety of biotechnology applications. Thermoresponsive polymers spontaneously and reversibly undergo temperature induced viscosity change (e.g., gelation) in water. Designing thermoresponsive polymers, however, represents a significant and ongoing challenge.

Poly(N-isopropylacrylamide), PNIPAM, is a typical example of a thermoresponsive polymer, which shows a temperature-induced collapse from an extended coil to a globular structure in water upon heating above 32° C., referred to as the lower critical solution temperature for PNIPAM. Polymers that display this type of physicochemical response to thermal stimuli have been widely explored as potential injectable drug-delivery systems. However, PNIPAM is not readily biodegradable and has recently been shown to exhibit cytotoxicity.

Lutz, J. F; Hoth, A. *Macromolecules* 2006, 39, 893-896; and Lutz, J. F.; Akdemir O.; Hoth, A. *J. Am. Chem. Soc.* 2006, 40, 13046-13047 reported another class of thermoresponsive polymers derived from copolymers of 2-(2-methoxyethoxy) ethyl methacrylate (MEO2MA) and oligo(ethyleneglycol) methacrylates (OEGMA). Copolymers of MEO$_2$MA and OEGMA exhibit lower critical solution temperatures that can be tuned between 26° C. to 90° C. simply by increasing the amount of OEGMA from 0 to 100 mole %. Significantly, the thermosensitivity of these acrylate copolymers was insensitive to concentration or ionic strength. While detailed cytotoxicity studies have not been carried out, the well known biocompatibility of polyethylene glycol (PEG) oligomers and PEG polymers suggests that copolymers of MEO$_2$MA and OEGMA are likely to be more biocompatible than PNIPAM, although not readily biodegradable.

Another class of thermoresponsive polymers are derived using CLICK chemistry to tag hydrophobic and hydrophilic functional groups onto cyclic esters. Polymerization generates random graft copolymers having a unique balance of hydrophobic and hydrophilic functional groups. The polymers exhibit lower critical solution temperature (LCST) behavior in water at elevated temperatures.

Recent advances in synthetic polymer chemistry have enabled the development of new and powerful strategies for the controlled synthesis of complex polymer architectures, block copolymers and functional materials. Organic catalysts for the ring-opening polymerization (ROP) of heterocyclic monomers, and a number of catalyst classes have been successfully used in ROP syntheses, including DMAP, phosphines, N-heterocyclic carbenes, bifunctional thioureaamines, and superbasic amines. The polymers derived by ROP methods include aliphatic polyesters and polycarbonates which are useful for a number of purposes including bulk packaging, resorbable medical implants, and drug delivery.

An ongoing need exists to extend synthetic advancements toward the design and preparation of new thermoresponsive polymers for injectable delivery systems.

SUMMARY

The shortcomings of the prior art are overcome and additional advantages are provided through the provision of biodegradable, biocompatible thermoresponsive polymers derived from cyclic carbonate monomers. In one embodiment, a block copolymer comprises a hydrophobic block and a hydrophilic block, wherein the hydrophobic block and the hydrophilic block comprise repeating units derived from ring opening polymerization of one or more cyclic carbonate monomers, wherein the one or more cyclic carbonate monomers are independently selected from compounds of the general formula (II):

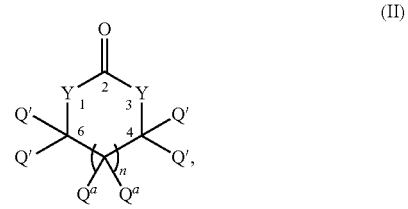

wherein each Q' and $Q^a$ group independently represents a hydrogen, an alkyl group comprising 1 to 20 carbons, a halide, a carboxy group, an ester group comprising one or more carbons, an amide group comprising one or more carbons, an aryl group comprising 6 to 20 carbons, an alkoxy group comprising one or more carbons, or a foregoing Q' or $Q^a$ group substituted with a carboxy group or an ester group comprising one or more carbons, at least one Q' and $Q^a$ group comprises an ester group comprising one or more carbons; each Y independently represents O, S, NH, or NQ"; n is an integer from 0 to 6, wherein when n is 0, carbons labeled 4 and 6 are linked together by a single bond; each Q" group independently represents an alkyl group comprising 1 to 20 carbons, an aryl group comprising 6 to 20 carbons, or a foregoing Q" group substituted with a carboxy group, or an ester group comprising one or more carbons.

In another embodiment, a method of preparing a block copolymer, by sequentially forming a hydrophilic block and a hydrophobic block of the block copolymer, wherein the hydrophilic block and the hydrophobic block each comprise repeating units derived by ring opening polymerization of the one or more cyclic carbonate monomers as described above in reference to formula (II).

In another embodiment, a hydrogel composition comprise an aqueous mixture of micelles comprising a block copolymer and a sequestered agent, wherein the block copolymer comprises a hydrophobic block and a hydrophilic block, the hydrophobic block and the hydrophilic block each comprising repeating units derived from ring opening polymerization of the one or more cyclic carbonate monomers as described above in reference to formula (II).

In another embodiment, a method comprises treating an aqueous mixture of a block copolymer with an agent to form a self-assembled nanostructure containing the block copolymer and the agent, wherein the block copolymer comprises a hydrophobic block and a hydrophilic block, the hydrophobic block and the hydrophilic block each comprising repeating units derived from ring opening polymerization of the one or more cyclic carbonate monomers as in reference to formula (II).

Additional features and advantages will become apparent from the following drawings and detailed description.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
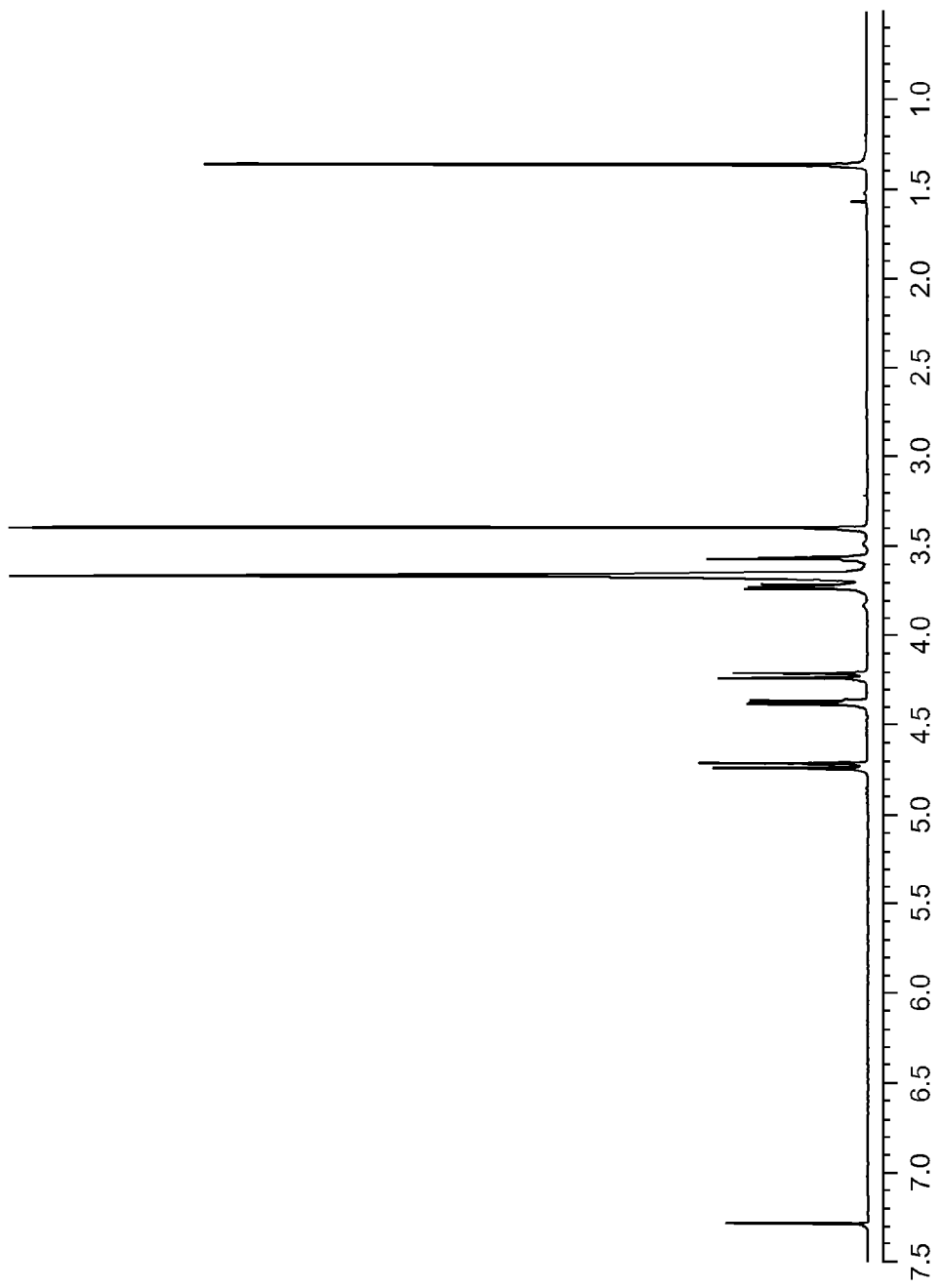
FIG. 1 is a $^1$H-NMR (CDCl$_3$) spectrum of MTC-PEG$_{350}$.

The detailed description explains the preferred embodiments of the invention, together with advantages and features, by way of example with reference to the drawings.

DETAILED DESCRIPTION

Amphiphilic thermoresponsive hydrogels and methods of preparation are disclosed herein. The amphiphilic thermoresponsive hydrogels comprise a biocompatible and biodegradable block copolymer prepared by organocatalytic ring opening polymerization of cyclic carbonate monomers. In water, the hydrogels are soft, nanostructured particles comprising a hydrophobic core, which is capable of reversibly sequestering a biologically active agent (e.g., a drug), and a hydrophilic shell to control lower critical solution temperature (LCST) behavior. The hydrogels have a LCST of about 25° C. to about 50° C., more specifically about 30° C. to about 40° C., at or near human body temperature of 37° C. (98.6° F.). The hydrogels are attractive for drug delivery systems, smart surfaces, bioseparations, controlled filtration, and for controlling enzyme activity. Also disclosed are injectable compositions comprising an aqueous mixture of loaded hydrogel and a reversibly sequestered biologically active agent. The injectable compositions are designed to undergo a rapid, reversible, sol-gel transition when heated through the LCST at or near body temperature. The gelled particles remain in the vicinity of the injection site to gradually release the sequestered biologically active agent.

Generally, the cyclic carbonate monomers are formed from precursor compounds comprising three or more carbons, two or more X groups, and optionally one or more carboxy groups (i.e., —COOH). The two or more X groups independently represent an alcohol, a primary amine, a secondary amine, or a thiol group. All of the cyclic carbonate monomers used in preparing the hydrogels are derived from precursor compounds having the general formula (I):

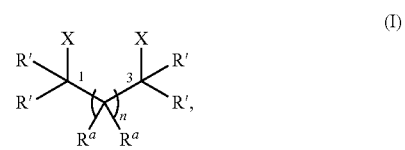

wherein each X independently represents OH, NHR", NH$_2$, or SH; n is an integer from 0 to 6, wherein when n is 0, carbons labeled 1 and 3 (attached to the X groups) are linked together by a single bond; each R' and R$^a$ group independently represents a hydrogen, a halide, a carboxy group, an alkyl group comprising 1 to 20 carbons, an ester group comprising 1 to 20 carbons, an amide group comprising 1 to 20 carbons, an aryl group comprising 3 to 20 carbons, an alkoxy group comprising 1 to 20 carbons, or a foregoing R' or R$^a$ group substituted with a carboxy group; each R" group independently represents an alkyl group comprising 1 to 20 carbons, an aryl group comprising 3 to 20 carbons, or a foregoing R" group substituted with a carboxy group. The R', R$^a$ and R" groups can also independently comprise a cycloaliphatic ring, an aromatic ring, and/or a heteroatom such as oxygen, sulfur or nitrogen. The R', R$^a$ or R" groups can also together form a ring that can include a heteroatom such as oxygen, sulfur or nitrogen. In an embodiment, at least one of the R', R$^a$ or R" groups independently comprises a carboxy group, or a protected carboxy group such as an ester, amide or thioester. In another embodiment, n is 0 or 1, one R$^a$ group is methyl or ethyl, and the other R$^a$ group is a carboxy group.

"Aryl groups" as the term is used herein, include aromatic hydrocarbons such as benzene and naphthalene, and aromatic heterocycles including oxazole, imidazole, thiazole, isoxazole, furan, pyrazole, isothiazole, pyridine, pyrazine, pyrimidine, pyridazine, and the like. An aryl group can comprise as few as three carbons.

Cyclic carbonate monomers derived from the precursors of formula (1) have the general formula (II):

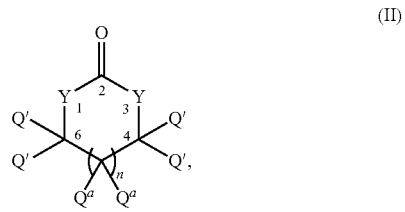

wherein each Q' or Q$^a$ group independently represents a hydrogen, an alkyl group of 1 to 20 carbons, a halide, a carboxy group, an acid chloride group, an ester group comprising one or more carbons, an amide group comprising one or more carbons, an aryl group comprising 3 to 20 carbons, an alkoxy group comprising one or more carbons, or a foregoing Q' or Q$^a$ group substituted with a carboxy group, an acid chloride group, an ester group comprising one or more carbons; at least one Q' or Q$^a$ group comprises a reactive carboxyl group selected from the group consisting of carboxylic acid, acid chloride and ester groups comprising one or more carbons; each Y independently represents O, S, NH or NQ"; n is an integer from 0 to 6, wherein when n is 0, carbons labeled 4 and 6 (attached to each Y group) are linked together by a single bond; each Q" group independently represents an alkyl group comprising 1 to 20 carbons, an aryl group comprising 3 to 20 carbons, or a foregoing Q" group substituted with a carboxy group, an acid chloride group, or an ester group comprising one or more carbons. The Q', $Q^a$ and Q" groups can further independently comprise a cycloaliphatic ring, an aromatic ring, and/or a heteroatom such as oxygen, sulfur or nitrogen. The Q', $Q^a$ or Q" groups can also together form a ring that can include a heteroatom such as oxygen, sulfur or nitrogen. In an embodiment, n is 1, one $Q^a$ group is a methyl or ethyl group, the other $Q^a$ group is a carboxylic acid, acid chloride or ester group comprising one or more carbons, and all Q' and Q" groups are hydrogen.

More specific precursor compounds have the general formula (III):

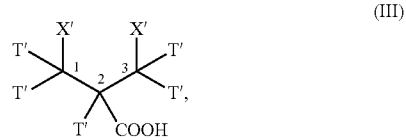

wherein each X' independently represents OH, NHT", $NH_2$, or SH; each T' can independently represent a hydrogen, a halide, a carboxy group (i.e., the moiety —COOH), an alkyl group comprising 1 to 20 carbons, an ester group comprising 1 to 20 carbons, an amide group, an aryl group comprising 3 to 20 carbons, an alkoxy group comprising 1 to 20 carbons, or a foregoing T' group substituted with a carboxy group; each T" independently represents an alkyl group comprising 1 to 20 carbons, an aryl group comprising 3 to 20 carbons, or a foregoing T" group substituted with a carboxy group. The T' and T" groups can also independently comprise a cycloaliphatic ring, an aromatic ring, or a heteroatom such as oxygen, sulfur or nitrogen. The T' or T" groups can also together form a ring that can include a heteroatom such as oxygen, sulfur or nitrogen. In an embodiment, none of the T' or T" groups comprises a carboxy group. In another embodiment, the T' attached to the carbon labeled 2 in formula (5) is an ethyl or methyl group, and all other T' groups are hydrogen.

The cyclic carbonate monomers can comprise a cyclic carbonate, cyclic carbamate, cyclic urea, cyclic thiocarbonate, cyclic thiocarbamate, cyclic dithiocarbonate, or combinations thereof, derived from the two or more X groups of formula (I), or X' groups of formula (III). As shown above the cyclic carbonate monomer can comprise a carboxylic acid, which can be converted to an ester comprising more than one carbon. It is understood that numerous synthetic pathways exist for forming esters from carboxylic acids and primary or secondary alcohols. Other numerous methods exist for preparing active esters that can be displaced by a primary or secondary alcohol to form an ester. The ester can be formed before, after, or simultaneously with the formation of the cyclic carbonyl group. It is also understood that one method of forming an ester might be more suitable than another due to steric constraints of the alcohol, relative hazards associated with the reagents, and other considerations effecting reaction efficiency, yield, and/or environmental impact.

More specific cyclic carbonate monomers, derived from the precursor compounds of general formula (III), have the general formula (IV):

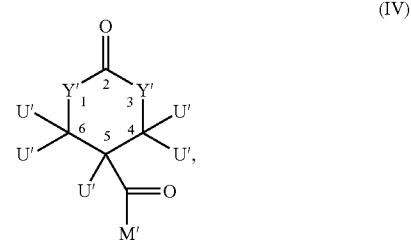

wherein each Y' independently represents O, S, NH or NU"; M' represents OH, chloride, or an ester comprising one or more carbons; each U' group independently represents a hydrogen, a halide, an alkyl group comprising 1 to 20 carbons, a carboxy group (i.e., —COOH), an ester comprising one or more carbons, an amide group comprising one or more carbons, a thioester group comprising one or more carbons, or an aryl group comprising 3 to 20 carbons. Each U" group independently represents an alkyl group comprising 1 to 20 carbons or an aryl group comprising 3 to 20 carbons, or a foregoing U" group substituted with an ester group or carboxy group. In an embodiment, none of the U' or U" groups comprise an ester group or a carboxy group. In another embodiment, Y' is oxygen, the U' group attached to the carbon labeled 5 is a methyl or ethyl group, M' represents OH, chloride, or an ester comprising one or more carbons, and all other U' groups are hydrogen.

The above-described cyclic carbonate monomers, such as those possessing a carboxy group or active ester group, can be derivatized to form other cyclic carbonate monomers effective in forming hydrogels. For example, the carboxylic acid group of formulas (II) or (IV) can be converted to an active carbonyl either in situ (such as with DCC) or stepwise (e.g., by way of an acid chloride, p-nitrophenyl ester, or other active ester). The active carbonyl can then be converted into an ester, amide or thioester group by reaction with an alcohol, amine or thiol group, respectively to produce cyclic carbonyl compounds of varying hydrophobicity or hydrophilicity.

More specific cyclic carbonate monomers contain an ester group and have the formula (V):

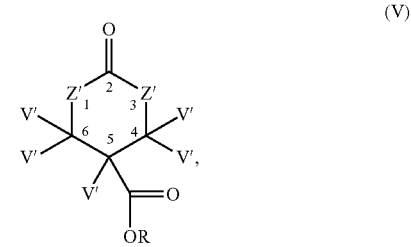

wherein each Z' independently represents O, S, NH or NV"; R represents a group having one or more carbons, each V' group independently represents a hydrogen, a halide, an alkyl group comprising 1 to 20 carbons, an ester group comprising one or more carbons, an amide group comprising one or more carbons, an aryl group comprising 3 to 20 carbons, or an alkoxy group comprising one or more carbons; each V" group independently represents an alkyl group comprising 1 to 20 carbons or an aryl group comprising 3 to 20 carbons, or a foregoing V''' group substituted with an ester group comprising one or more carbons. In an embodiment, each Z' is oxygen, the V' at carbon labeled 5 is a methyl or ethyl group, and all other V' groups are hydrogen.

Even more specific cyclic carbonate monomers comprise cyclic carbonates having the formula (VI):

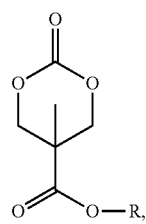

(VI)

wherein R comprises one or more carbons. Particularly useful R groups include alkyl groups comprising from 1 to 20 carbons (e.g., ethyl and lauryl), and poly(alkylene ether)s having the structure (VII):

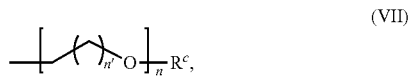

(VII)

wherein n is an integer from 1 to 25, more particularly 3-15; n' is an integer from 1 to 10; and $R^c$ is hydrogen or an alkyl group having 1 to 20 carbons. In an embodiment, the poly(alkylene ether) is a poly(ethylene glycol) monoalkyl ether having a molecular weight of from about 200 to about 100,000 Daltons. In another embodiment, n' is 1, n is an integer from 1 to 25, and $R^c$ is methyl.

A non-limiting example of a precursor compound useful in forming many cyclic carbonate monomers of formula (6) is 2,2-bis(methylol)propionic acid, bis-MPA, a building block for biocompatible dendrimers. The cyclic carbonate monomers derived from bis-MPA are used to introduce functionality and connectivity into a ROP polyester or polycarbonate block copolymer in a controlled fashion, thereby tailoring the hydrophilic/hydrophobic balance for a desired LCST response. One method of introducing this functionality into bis-MPA is shown in Scheme I:

Scheme I.

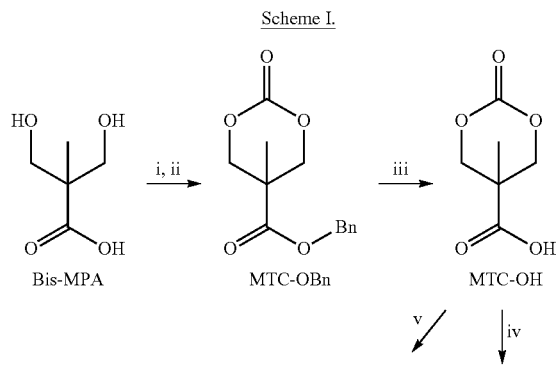

As shown, bis-MPA is first converted to a benzyl ester (i), followed by reaction with triphosgene (ii) to form the benzyl ester, 2-benzyloxycarbonyl-2-methyltrimethylene carbonate (MTC-OBn). MTC-OBn is then debenzylated (iii) to produce the free carboxylic acid, 2-hydroxycarbonyl-2-methyltrimethylene carbonate (MTC-OH). MTC-OH can then be esterified with an alcohol (ROH) to form an ester (MTC-OR), where R is a group comprising one or more carbons. ROH is a monomeric or polymeric alcohol comprising a pendant or terminal alcohol group. Two pathways are shown for forming the ester MTC-OR. In the first pathway, (iv), the free acid, MTC-OH, is treated in situ with a suitable carboxy activating agent, such as dicyclohexylcarbodiimide, DCC, and an alcohol, ROH, to form the MTC-OR in a single step. Alternatively, MTC-OH can be converted first (v) to an acid chloride, 2-chlorocarbonyl-2-methyltrimethylene carbonate (MTC-Cl) followed by treatment (vi) of MTC-Cl with ROH in the presence of a base to form MTC-OR. Both pathways are exemplary and are not meant to be limiting. The following conditions are typical for the reactions shown in Scheme 1: (i) Benzylbromide (BnBr), KOH, DMF, 100° C., 15 hours, 62% yield of the benzyl ester of bis-MPA. (ii) triphosgene, pyridine, $CH_2Cl_2$, −78° C. to 0° C., 95% yield of MTC-OBn. (iii) Pd/C (10%), $H_2$ (3 atm), EtOAc, room temperature, 24 hours, 99% yield of MTC-OH. (iv) ROH, DCC, THF, room temperature, 1 to 24 hours. (v) $(COCl)_2$, THF, room temperature, 1 hour, 99% yield of MTC-Cl. (vi) ROH, $NEt_3$, room temperature, 3 hours yields MTC-OR. As used herein, room temperature is generally defined as about 15° C. to about 30° C.

Isomerically pure precursor compounds that have a hydrogen attached to an asymmetric carbon adjacent to an ester group or carboxy group can be converted to cyclic carbonate monomers without undergoing significant racemization of the asymmetric carbon. An enantiomeric excess of 80% or more, more specifically of 90%, is possible. In an embodiment, the cyclic carbonate monomer comprises an asymmetric carbon as an (R) isomer, in an enantiomeric excess of greater than 80%, more specifically greater than 90%. In another embodiment, the cyclic carbonate monomer comprises an asymmetric carbon as an (S) isomer, in an enantiomeric excess greater than 80%, more specifically greater than 90%.

Examples of cyclic carbonate monomers useful in forming hydrogels include but are not limited to:

(MTC-C2)

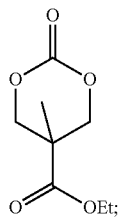

(VIII)

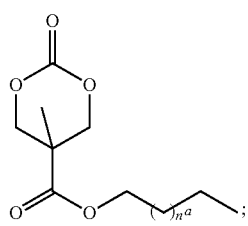

(IX)

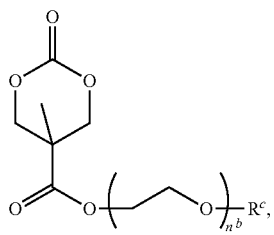

(X)

wherein $n^a$ is an integer from 1 to 25, $n^b$ is an integer from 1 to 25, more particularly 3 to 15, and $R^C$ is a alkyl group comprising 1 to 20 carbons. In formula (IX), when $n^a$ is 9, the monomer is dodecanoxycarbonyl-2-methyltrimethylene carbonate, (MTC-C12, wherein C#=number of carbons). In formula (X), when $n^b$ is about 10, and $R^C$=methyl, the monomer is 2-poly(ethylene glycol)oxycarbonyl-2-methyltrimethylene carbonate (MTC-PEG$_{550}$).

MTC-PEG$_m$ is derived from MTC-OH, or an active ester derivative thereof, and a poly(ethylene glycol) monoalkyl ether. The PEG subscript m (e.g., "550" in "PEG$_{550}$") represents the number average molecular weight ($M_n$) of the poly(ethylene glycol) monoalkyl ether. The poly(ethylene glycol) monoalkyl ether can have an $M_n$ from about 100 to about 50,000, more particularly about 100 to about 5,000 and most particularly from about 100 to about 1000.

The cyclic carbonate monomers are independently selected from the above-described cyclic carbonate monomers to form the hydrogel block copolymer. Isotactic forms of the polymers can be produced depending on the cyclic monomer(s), its isomeric purity, and the polymerization conditions.

The hydrogels are prepared by sequentially polymerizing by ring opening methods one or more different cyclic carbonate monomers to form the hydrophilic block and the hydrophobic block of the block copolymer. The block copolymer can comprise more than one hydrophobic block and/or hydrophilic block if desired. The blocks are distinguished by their affiliation for water as well as their chemical structure. Thus, n" sequential ROP steps are used to form an n"-block copolymer, where n" is an integer greater than or equal to 2, more specifically 2 to 10, and even more specifically 2 to 4. Many configurations of block sequences are possible. For example, diblock copolymers comprising A and B blocks can be represented as -AB-copolymers. Triblock copolymers comprising A and B blocks can be represented as -ABA- or -BAB-copolymers. Tetrablock copolymers comprising A and B blocks can be represented as -ABAB-copolymers. Triblock polymers comprising A, B, and C blocks can be represented, for example, as -ABC-, -ACB-, or -BAC-copolymers. Tetrablock copolymers comprising A, B and C blocks can be represented, for example, as -ABCA-, -ABCB, -ACAB, -BCAB-, -BCAC-, -CABA, and -CABC-copolymers. The above examples of block sequences in block copolymers are not meant to be limiting. Due to the large number of possible hydrophilic and hydrophobic cyclic carbonate monomers, and possible block configurations, the block copolymers can be tailored to a specific lower critical solution temperature behavior and/or binding strength to a biologically active agent.

The hydrophobic block of the block copolymer has an average degree of polymerization (DP) of more than 0 and less than or equal to about 40, more particularly about 10 to about 30. The hydrophilic block has an average degree of polymerization of about 5 to about 90, more particularly 20 to 60.

More specifically, the method of forming a hydrogel comprises forming a first mixture comprising one or more cyclic carbonate monomers, a catalyst, an initiator, and an optional solvent. The first mixture is then heated and agitated to effect polymerization of the one or more cyclic carbonate monomers, forming a second mixture comprising a first polymer, the A block. One or more additional cyclic carbonate monomers, and an optional second portion of catalyst are added to the second mixture to form a third mixture. The third mixture is then agitated to effect polymerization of the B block. At a concentration of 0.1 to 10 g/L in water, the resulting block copolymer, a hydrogel, has a reversible LCST of from about 25° C. to about 50° C. The LCST can be determined by a sudden change in physico-chemical property of an aqueous mixture of the block copolymer. For example, the LCST is determined to be a temperature at which the transmittance of an aqueous solution of the block copolymer (e.g., a concentration of 1 mg/mL) is largely decreased (e.g., 10~20%), compared to that of the aqueous mixture under LCST (e.g., at 10° C.). Alternatively, the LCST transition can be determined by differential scanning calorimetry (DCS) or dynamic mechanical analysis. The LCST can be determined from the onset of an endothermic peak or sudden increase in modulus.

An exemplary homopolymer prepared from a cyclic carbonate monomer of formula (II) has the general formula (XI):

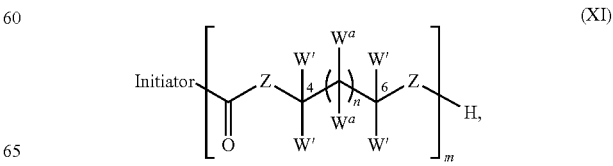

(XI)

wherein at least one W' or $W^a$ group comprises an ester, m is an integer greater than 1, "Initiator" is a polymerization initiator moiety (e.g., $C_6H_5CH_2O$ derived from benzyl alcohol; the initiator can also be a polymer chain having a terminal or pendant hydroxyl, amine, or thiol group). Each Z independently represents O, S, NH or NW'''; n is an integer from 0 to 6, wherein when n is 0, carbons labeled 4 and 6 are linked together by a single bond; and each W' and $W^a$ group independently represents a hydrogen, a halide, an alkyl group comprising 1 to 20 carbons, an ester group comprising 1 to 20 carbons, an amide group comprising 1 to 20 carbons, an aryl group comprising 3 to 20 carbons, an alkoxy group comprising 1 to 20 carbons, or a foregoing W' or $W^a$ group substituted with an ester; each W''' group independently represents an alkyl group comprising 1 to 20 carbons, an aryl group comprising 3 to 20 carbons, or a foregoing W''' group substituted with an ester. More particularly, m is an integer from 1 to 10,000, from 100 to 5000, or from 100 to 1000. In an embodiment, n is 1, Z is oxygen, one $W^a$ group is a methyl or ethyl group, another $W^a$ group is a —$CO_2R$ group wherein R is an alkyl ester comprising 1 to 20 carbons, and all other W' groups are hydrogen.

The polymer of formula (VII) is a living polymer, meaning the terminal Z—H group can initiate the polymerization of a new chain (i.e., block), comprising the same or a different cyclic carbonate monomer. Typically, additional catalyst is added to drive the polymerization of the new block.

An exemplary living polymer prepared from a cyclic carbonate monomer of formula (V) has the general formula (XII):

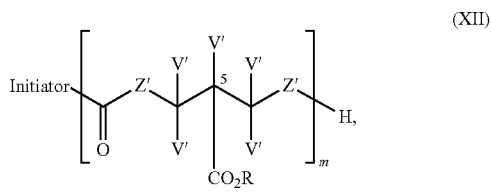

(XII)

wherein "Initiator" is as defined above, each Z' independently represents O, S, NH or NV'''; R represents a group comprising one or more carbons, each V' group independently represents a hydrogen, a halide, an alkyl group comprising 1 to 20 carbons, an ester group comprising one or more carbons, an amide group comprising one or more carbons, an aryl group comprising 3 to 20 carbons, or an alkoxy group comprising one or more carbons; each V''' group independently represents an alkyl group comprising 1 to 20 carbons or an aryl group comprising 3 to 20 carbons, or a foregoing V''' group substituted with an ester group comprising one or more carbons. In an embodiment, Z' is oxygen, V' attached to carbon labeled 5 is methyl or ethyl, all other V' groups are hydrogen, and R is a group comprising one or more carbons.

A non-limiting example of a diblock copolymer derived from three different cyclic carbonate monomers, formed by two sequential polymerizations is illustrated in Scheme 2:

Scheme 2.

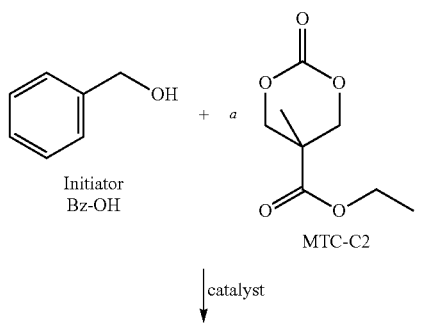

Initiator
Bz-OH

MTC-C2 catalyst

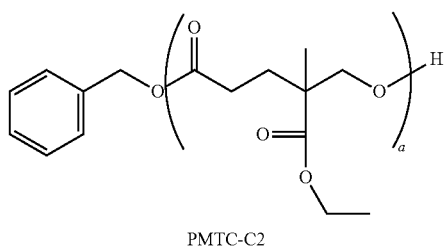

PMTC-C2

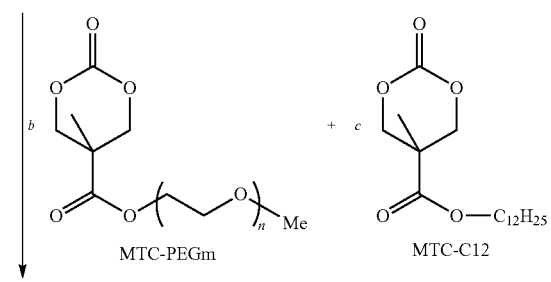

MTC-PEGm

MTC-C12

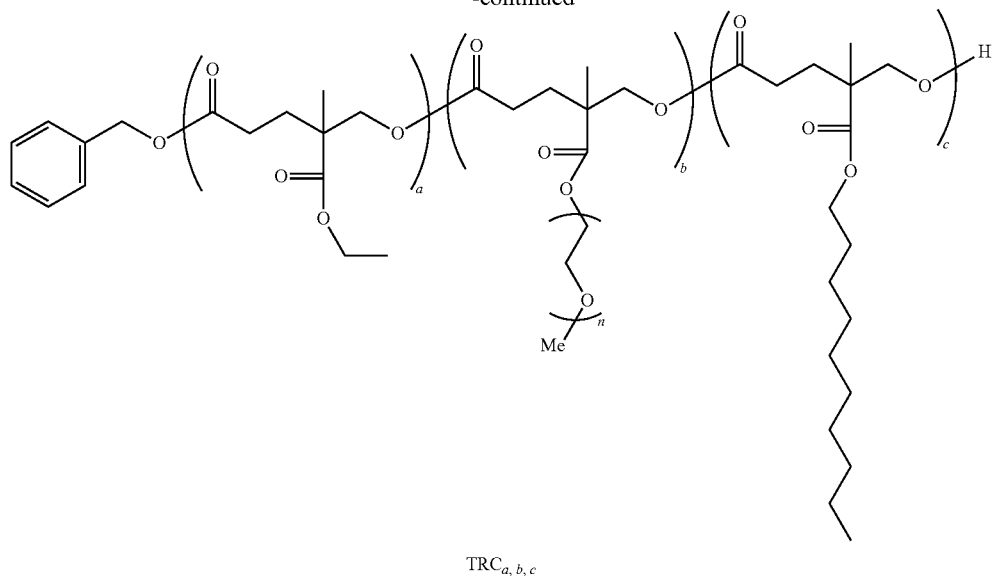

TRC$_{a,b,c}$

In the first polymerization, benzyl alcohol initiates ROP of MTC-C2 in the presence of a catalyst, producing the A block homopolymer, poly(2-ethoxycarbonyl-2-methyltrimethylene carbonate (PMTC-C2). A mixture comprising two monomers, MTC-C12 and MTC-PEG$_{350}$ (n is about 7-8 in the structure of Scheme 2), and optional additional catalyst, is then added to PMTC-C2. PMTC-C2 initiates polymerization to form the B block, shown in brackets in Scheme 2, comprising a random copolymer of MTC-C12 and MTC-PEG$_{550}$. The resulting block copolymer, labeled TRC$_{a,b,c}$ is a thermoresponsive polycarbonate (TRC). The subscripts in the name TRC$_{a,b,c}$ represent the degree of polymerization (DP), of each cyclic carbonate monomer in the block copolymer. Subscript a is an integer from more than 0 to less than or equal to about 40, more particularly about 10 to about 30. The sum of subscripts b and c together can be from 5 to 90, more particularly 20 to 60. The hydrophilic block can comprise MTC-PEG$_{550}$ and MTC-C12 in a mole ratio is 0.5 to 6 respectively, more particularly a mole ratio of 1 to 3 respectively. The number average molecular weight of the block copolymer can be from 600 to 60,000 g/mol, more particularly 15,000 and 40,000 g/mol.

Each of the monomers in Scheme 2 is derived from the 2,2-bis(methylol)propionic acid (bis-MPA). The A block is hydrophobic due to the MTC-C2. The B block is hydrophilic due to the MTC-PEG$_m$. The B block also contains hydrophobic subunits derived from MTC-C12. By varying the amounts of MTC-C12 and MTC-PEG$_m$ in the B block, the hydrophilic properties of the B block can be tuned to a specific LCST response. The hydrophobic/hydrophilic balance can further be adjusted by varying the molecular weight of the PEG, the length of the ester alkyl chain in MTC-C12, the length of the ester alkyl chain in the A block, and/or by adding additional hydrophilic and/or hydrophobic blocks to the block copolymer.

The ring opening polymerization is generally conducted in a reactor under inert atmosphere such as nitrogen or argon. The polymerization can be performed by solution polymerization in an inactive solvent such as benzene, toluene, xylene, cyclohexane, n-hexane, dioxane, chloroform and dichloroethane, or by bulk polymerization. The ROP reaction temperature can be from 20° to 250° C. Generally, the reaction mixture is heated at atmospheric pressure for 0.5 to 72 hours to effect polymerization. Subsequently, additional cyclic monomer and catalyst can be added to the second mixture to effect block polymerization if desired.

Exemplary ROP catalysts include tin(II)-2-ethyyhexanoate (stannous octoate), tin (II) butoxide, tin (IV) alkoxides, tetramethoxy zirconium, tetra-iso-propoxy zirconium, tetra-iso-butoxy zirconium, tetra-n-butoxy zirconium, tetra-t-butoxy zirconium, triethoxy aluminum, tri-n-propoxy aluminum, tri-iso-propoxy aluminum, tri-n-butoxy aluminum, tri-iso-butoxy aluminum, tri-sec-butoxy aluminum, mono-sec-butoxy-di-iso-propoxy aluminum, ethyl acetoacetate aluminum diisopropylate, aluminum tris(ethyl acetoacetate), tetraethoxy titanium, tetra-iso-propoxy titanium, tetra-n-propoxy titanium, tetra-n-butoxy titanium, tetra-sec-butoxy titanium, tetra-t-butoxy titanium, tri-iso-propoxy gallium, tri-iso-propoxy antimony, tri-iso-butoxy antimony, trimethoxy boron, triethoxy boron, tri-iso-propoxy boron, tri-n-propoxy boron, tri-iso-butoxy boron, tri-n-butoxy boron, tri-sec-butoxy boron, tri-t-butoxy boron, tri-iso-propoxy gallium, tetramethoxy germanium, tetraethoxy germanium, tetra-iso-propoxy germanium, tetra-n-propoxy germanium, tetra-iso-butoxy germanium, tetra-n-butoxy germanium, tetra-sec-butoxy germanium and tetra-t-butoxy germanium; halogenated compound such as antimony pentachloride, zinc chloride, lithium bromide, tin(IV) chloride, cadmium chloride and boron trifluoride diethyl ether; alkyl aluminum such as trimethyl aluminum, triethyl aluminum, diethyl aluminum chloride, ethyl aluminum dichloride and tri-iso-butyl aluminum; alkyl zinc such as dimethyl zinc, diethyl zinc and diisopropyl zinc; tertiary amines such as triallylamine, triethylamine, tri-n-octylamine and benzyldimethylamine; heteropolyacids such as phosphotungstic acid, phosphomolybdic acid, silicotungstic acid and alkali metal salt thereof; zirconium compounds such as zirconium acid chloride, zirconium octanoate, zirconium stearate and zirconium nitrate. More particularly, the catalyst is zirconium octanoate, tetraalkoxy zirconium or a trialkoxy aluminum compound.

Other ROP catalysts include metal-free organocatalysts that can also provide a platform to polymers having controlled, predictable molecular weights and narrow polydispersities. Examples of organocatalysts for the ROP of cyclic esters, carbonates and siloxanes are 4-dimethylaminopyridine, phosphines, N-heterocyclic carbenes (NHC), bifunctional aminothioureas, phosphazenes, amidines, and guanidines.

The ROP reaction mixture comprises at least one catalyst and, when appropriate, several catalysts together. The ROP catalyst is added in a proportion of 1/20 to 1/40,000 moles relative to the cyclic monomers, and preferably of 1/100 to 1/20,000 moles. In an embodiment, the catalyst is a combination of 1,8-diazabicyclo[5.4.0]undec-7-ene (DBU), and 1-(3,5-bis(trifluoromethyl)phenyl-3-cyclohexyl-2-thiourea, TU.

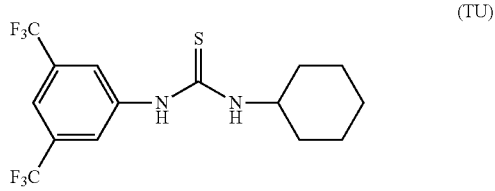 [SMILES: FC(F)(F)c1cc(NC(=S)NC2CCCCC2)cc(C(F)(F)F)c1]

(TU)

The ROP reaction mixture also comprises an initiator. Initiators generally include nucleophiles such as alcohols, amines or thiols. The initiator can be mono functional, difunctional or multifunctional such as dendritic, polymeric or related architectures. Monofunctional initiators can include nucleophiles with protected functional groups that include thiols, amines, acids and alcohols. A typical initiator is phenol or benzyl alcohol.

Well-known apparatuses can be used for performing the ROP polymerization. An example of a tower type reaction apparatus includes a reaction vessel comprising helical ribbon wings and transformational spiral baffles. Examples of sideways type reaction apparatuses include sideways type one-or twin-shaft kneaders comprising agitation shafts that have a row of transformational wings arranged in parallel to each other. In addition, the reaction apparatus can be either a batch type or a continuous one.

The hydrogels comprise block copolymers having a number-average molecular weight of about 1,000 to about 100,000, more particularly about 10,000 to about 40,000. The hydrophilic block typically has a number average molecular weight of 1,500 to 6,000. The hydrophobic block typically has a has a number average molecular weight of 8,000 to 35,000.

The unloaded hydrogel particles (without a sequestered biologically active agent) have an average spherical diameter of 20 to 1000 nanometers, more specifically 20 to 200 nanometers, and even more specifically 20 to 100 nanometers.

The hydrogels can self-assemble into micelles in aqueous solution, and therefore have utility as transport vehicles for biologically active agents, particularly in the form of injectable compositions. An injectable hydrogel composition comprises an aqueous mixture of micelles (self-assembled nanostructures) containing the hydrogel and a sequestered biologically active agent. These loaded micelles are freely moving below the LCST (i.e., mutually repulsed resulting in low viscosity). Above the LCST, the micelles rapidly, reversibly, coalesce to form a gel. The gel provides an in situ medium for the slow release of the biologically active agent to the surrounding tissue of the injected site.

A method of forming an injectable composition comprises treating an aqueous mixture of a biodegradable block copolymer with a biologically active agent to form micelles containing the block copolymer and the biologically active agent, wherein the block copolymer comprises a hydrophobic block and a hydrophilic block, the hydrophobic block and the hydrophilic block each comprising repeating units derived from ring opening polymerization of one or more cyclic carbonate monomers.

The term "biologically active agent" as used herein means any substance which can affect any physical or biochemical properties of a biological organism. Biological organisms include but are not limited to viruses, bacteria, fungi, plants, animals, and humans. In particular, a biologically active agent includes any substance intended for the diagnosis, cure, mitigation, treatment, or prevention of disease in humans or other animals, or to otherwise enhance physical or mental well being of humans or animals. Examples of biologically active agents include, but are not limited to, organic and inorganic compounds, proteins, peptides, lipids, polysaccharides, nucleotides, DNAs, RNAs, other polymers, and derivatives thereof. Examples of biologically active agents include antibiotics, fungicides, anti-viral agents, anti-inflammatory agents, anti-tumor agents, cardiovascular agents, anti-anxiety agents, hormones, growth factors, steroidal agents, and the like. Other examples include microorganisms such as bacteria and yeast cells, viral particles, plant or animal or human cells, and the like.

The hydrogels can also be applied to conventional molding methods such as compression molding, extrusion molding, injection molding, hollow molding and vacuum molding, and can be converted to molded articles such as various parts, receptacles, materials, tools, films, sheets and fibers. A molding composition can be prepared comprising the polymer and various additives, including for example nucleating agents, pigments, dyes, heat-resisting agents, antioxidants, weather-resisting agents, lubricants, antistatic agents, stabilizers, fillers, strengthened materials, fire retardants, plasticizers, and other polymers. Generally, the molding compositions comprise 30 wt. % to 100 wt. % or more of the polymer based on total weight of the molding composition. More particularly, the molding composition comprises 50 wt. % to 100 wt. % of the polymer. The polymers, and articles molded therefrom, can be biodegradable.

The polymer product of the ROP polymerization can be formed into free-standing or supported films by known methods. Non-limiting methods to form supported films include dip coating, spin coating, spray coating, and doctor blading. Generally, such coating compositions comprise 0.01 wt. % to 90 wt. % of the polymer based on total weight of the coating composition. More particularly, the molding composition comprises 1 wt. % to 50 wt. % of the polymer based on total weight of the coating composition. The coating compositions generally also include a suitable solvent necessary to dissolve the polymer product.

The coating compositions can further include other additives selected so as to optimize desirable properties, such as optical, mechanical, and/or aging properties of the films. Non-limiting examples of additives include surfactants, ultraviolet light absorbing dyes, heat stabilizers, visible light absorbing dyes, quenchers, particulate fillers, and flame retardants. Combinations of additives can also be employed.

The following examples demonstrate the preparation of cyclic carbonate monomers and the polymerization of the monomers to form homopolymers and block copolymers.

EXAMPLES

Example 1

Synthesis of MTC-C2

2,2-bis(methylol)propionic acid (bis-MPA) (22.1 g, 0.165 mol) was added in ethanol (150 mL) with Amberlyst-15 (6.8 g) and refluxed overnight. The resins were then filtered out and the filtrate was evaporated. Methylene chloride (200 mL) was added to the resulting viscous liquid to filter the unreacted reagent and by-products. The solution was dried over $MgSO_4$, filtered, and the solvent was removed in vacuo. Ethyl 2,2-bis(methylol)propionate was obtained as a clear and colorless liquid (21.1 g, 86% yield).

A solution of triphosgene (19.5 g, 0.065 mol) in $CH_2Cl_2$ (200 mL) was then added stepwise to a $CH_2Cl_2$ solution (150 mL) of ethyl 2,2-bis(methylol)propionate (21.1 g, 0.131 mol) and pyridine (64 mL, 0.786 mol) over 30 min at −75° C. with dry-ice/acetone. The reaction mixture was kept stirring for another 2 hours under chilled conditions, then allowed to warm to room temperature. Saturated $NH_4Cl$ aqueous solution (200 mL) was added to the reaction mixture to decompose excess triphosgene. The organic phase was then treated with 1N aqueous HCl (200 mL), followed by saturated $NaHCO_3$ (200 mL), brine (200 mL), and water (200 mL). After the $CH_2Cl_2$ solution was dried over $MgSO_4$ and evaporated, the residue was recrystallized from ethyl acetate to give white crystals (13.8 g, 56% yield). $^1H$ NMR (400 MHz in $CDCl_3$): d 4.68 (d, 2H, $CH_2OCOO$), 4.25 (q, 1H, $OCH_2CH_3$), 4.19 (d, 2H, $CH_2OCOO$), 1.32 (s, 3H, $CH_3$), 1.29 (t, 3H, $CH_3CH_2O$). $^{13}C$ NMR (100 MHz in $CDCl_3$): d 171.0, 147.5, 72.9, 62.1, 39.9, 17.3, 13.8. HR-ESI-MS: m/z calculated for $C_8H_{12}O_5$+Na 211.0582. found 221.0578.

Example 2

Synthesis of MTC-PEG$_{550}$

Methoxy poly(ethylene glycol) (MPEG$_{550}$) ($M_n$=550 g/mol, 8.0 g, 0.015 mol) and MTC-OH (2.8 g, 0.017 mol) were dissolved in THF (100 mL). N,N'-Dicyclohexylcarbodiimide (DCC) (3.5 g, 0.017 mol) was added to the flask. The formed DCC-urea derivative began to precipitate after about 5 minutes. The solution was stirred overnight to complete the reaction, followed by filtration of the DCC-urea, and evaporation of THF. The crude product was dissolved in anhydrous diethyl ether (500 mL) and cooled in the refrigerator. Residual MTC-OH precipitated in cold diethyl ether and was removed by filtration. The resulting solution was concentrated, and the product was dried in a vacuum oven until constant weight. Yield: ~80%. $^1H$-NMR (400 MHz in $CDCl_3$): =4.73-4.70 (d, 2H, —$CH_2OCOOCH_2CCH_3$—), 4.38-4.36 (t, 2H, PEG-$CH_2CH_2$—OCO), 4.22-4.20 (d, 4H, —$CH_2OCOOCH_2CCH_3$—), 3.65 (m, 4H, $OCH_2CH_2$ PEG), 3.38 (s, 3H, $OCH_2CH_2OCH_3$ PEG), 1.38 (s, 3H, $CCH_3CH_2CCOOCH_2$).

Example 3

Synthesis of MTC-PEG$_{350}$

Methoxy poly(ethylene glycol) (MPEG$_{350}$) ($M_n$=350 g/mol, 5.0 g, 0.014 mol) and MTC-OH (3.0 g, 0.019 mol) were dissolved in THF (100 mL). N,N'-Dicyclohexylcarbodiimide (DCC) (3.8 g, 0.019 mol) was added to the flask. The DCC-urea derivative began to precipitate after about 5 minutes. The solution was stirred overnight to complete the reaction, followed by filtration of the DCC-urea, and evaporation of THF. The crude product was dissolved in anhydrous diethyl ether (500 mL) and cooled in a refrigerator. Residual MTC-OH precipitated in cold diethyl ether and was removed by filtration. The resulting solution was concentrated, and the product was dried in a vacuum oven until constant weight. Yield: ~80%. $^1H$-NMR (400 MHz in $CDCl_3$): =4.73-4.70 (d, 2H, —$CH_2OCOOCH_2CCH_3$—), 4.38-4.36 (t, 2H, PEG-$CH_2CH_2$—OCO), 4.22-4.20 (d, 4H, —$CH_2OCOOCH_2CCH_3$—), 3.65 (m, 4H, $OCH_2CH_2$ PEG), 3.38 (s, 3H, $OCH_2CH_2OCH_3$ PEG), 1.38 (s, 3H, $CCH_3CH_2CCOOCH_2$).

Example 4

Synthesis of MTC-PEG$_{120}$

Methoxy poly(ethylene glycol) (MPEG$_{120}$) ($M_n$=120 g/mol, 3.0 g, 0.025 mol) and MTC-OH (5.2 g, 0.033 mol) were dissolved in THF (150 mL). N,N'-Dicyclohexylcarbodiimide (DCC) (6.7 g, 0.033 mol) was added to the flask. The DCC-urea derivative began to precipitate after about 5 minutes. The solution was stirred overnight to complete the reaction, followed by filtration of the DCC-urea, and evaporation of THF. The crude product was dissolved in anhydrous diethyl ether (500 mL) and cooled in a refrigerator. Residual MTC-OH precipitated in cold diethyl ether and was removed by filtration. The resulting solution was concentrated, and the product was dried in a vacuum oven until constant weight. Yield: ~80%. $^1H$-NMR (FIG. 1, 400 MHz in $CDCl_3$): =4.73-4.70 (d, 2H, —$CH_2OCOOCH_2CCH_3$—), 4.38-4.36 (t, 2H, PEG-$CH_2CH_2$—OCO), 4.22-4.20 (d, 4H, —$CH_2OCOOCH_2CCH_3$—), 3.65 (m, 4H, $OCH_2CH_2$ PEG), 3.38 (s, 3H, $OCH_2CH_2OCH_3$ PEG), 1.38 (s, 3H, $CCH_3CH_2CCOOCH_2$).

Example 5

Synthesis of MTC-C12

A mixture of bis-MPA (30.4 g, 0.227 mol), potassium hydroxide (88% assay; 13.5 g, 0.241 mol), and a mixture of DMF (20 mL) and acetonitrile (180 mL) was heated to 100° C. for 1 hour. Lauryl bromide (60 mL, 0.250 mol) was added to the warm solution, and stirring was continued at 100° C. for 16 hours. The reaction mixture was cooled to filter salts and the filtrate was evaporated under vacuum. Ethyl acetate (200 mL) was added to the residue. The organic solution was washed with water (200 mL×3), dried with $MgSO_4$, filtered, and concentrated to give lauryl 2,2-bis(methylol)propionate as a clear oil that solidified upon standing for several days (62.2 g, 91% yield).

Lauryl 2,2-bis(methylol)propionate (30.1 g, 0.100 mol) was then dissolved in $CH_2Cl_2$ (300 mL) and pyridine (50 mL, 0.6 mol) and the solution was chilled to −78° C. under $N_2$. A solution of triphosgene (15.0 g, 0.05 mol) in $CH_2Cl_2$ was added dropwise over 1 hour, at which point the reaction mixture was allowed to warm to room temperature for 2 hours. The reaction was quenched by addition of saturated aqueous $NH_4Cl$ (200 mL), after which the organic solution was washed with 1 M aqueous HCl (200 mL×3), saturated aqueous $NaHCO_3$ (200 mL), dried over $MgSO_4$, filtered and concentrated to give MTC-C12 as a white solid (28.1 g, 86% yield). MTC-C12 for polymerization was further purified by recrystallization from ethyl acetate. $^1H$ NMR (400 MHz in $CDCl_3$): d 4.68 (d, 2H, $CH_2OCOO$), 4.19 (d, 2H, CH$_2$OCOO), 4.18 (t, 1H, OCH$_2$CH$_2$), 1.65 (m, 2H, OCH$_2$CH$_2$), 1.33 (s, 3H, CH$_3$), 1.32-1.21 (m, 18H, CH$_2$), 0.87 (t, 3H, CH$_2$CH$_3$). $^{13}$C NMR (100 MHz in CDCl$_3$): δ 171.1, 147.4, 72.9, 66.3, 40.1, 31.8, 29.5, 29.4, 29.3, 29.2, 29.1, 28.3, 25.6, 22.6, 17.5, 14.0.

Example 5

Figure 2:
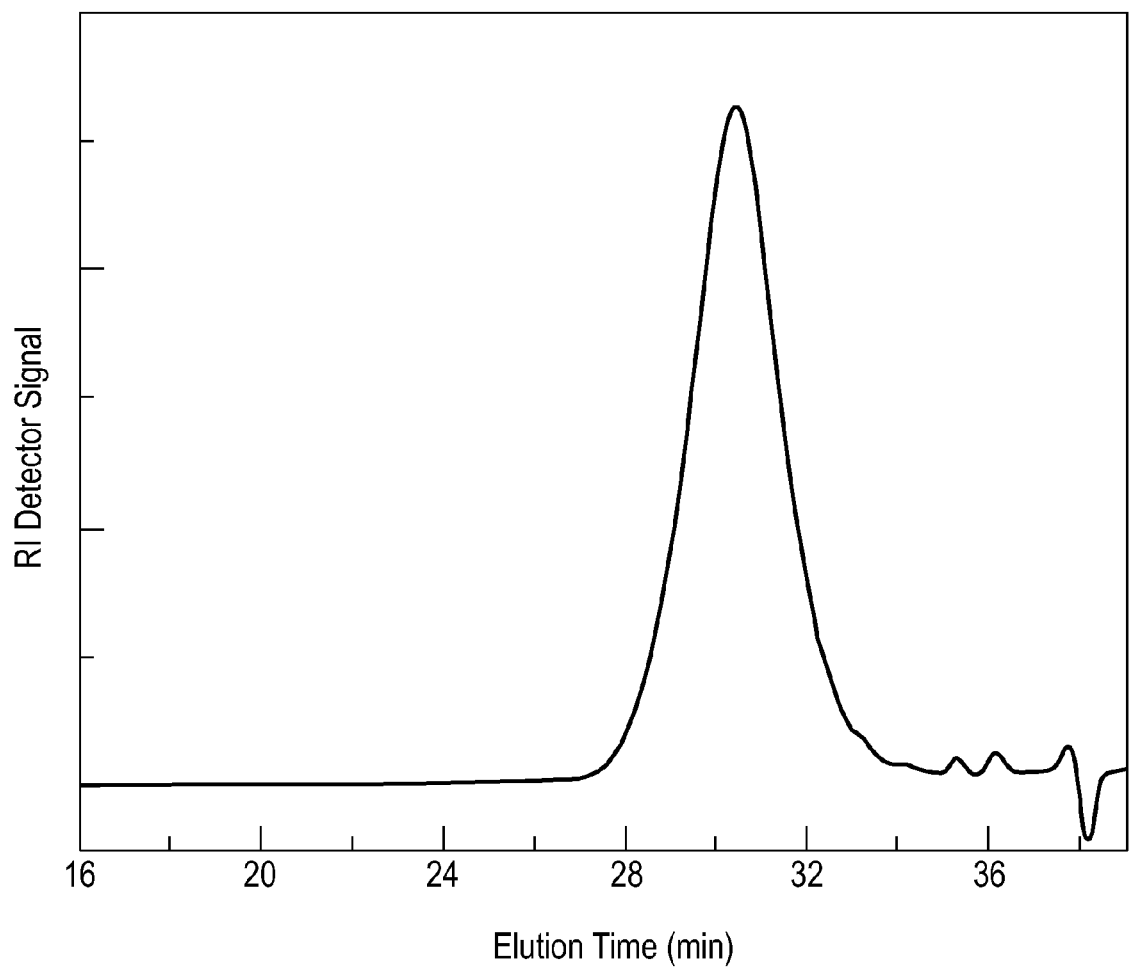
FIG. 2 is graph of a GPC curve of TRC(PEG350)$_{10,30,30}$ in THF.
Figure 3:
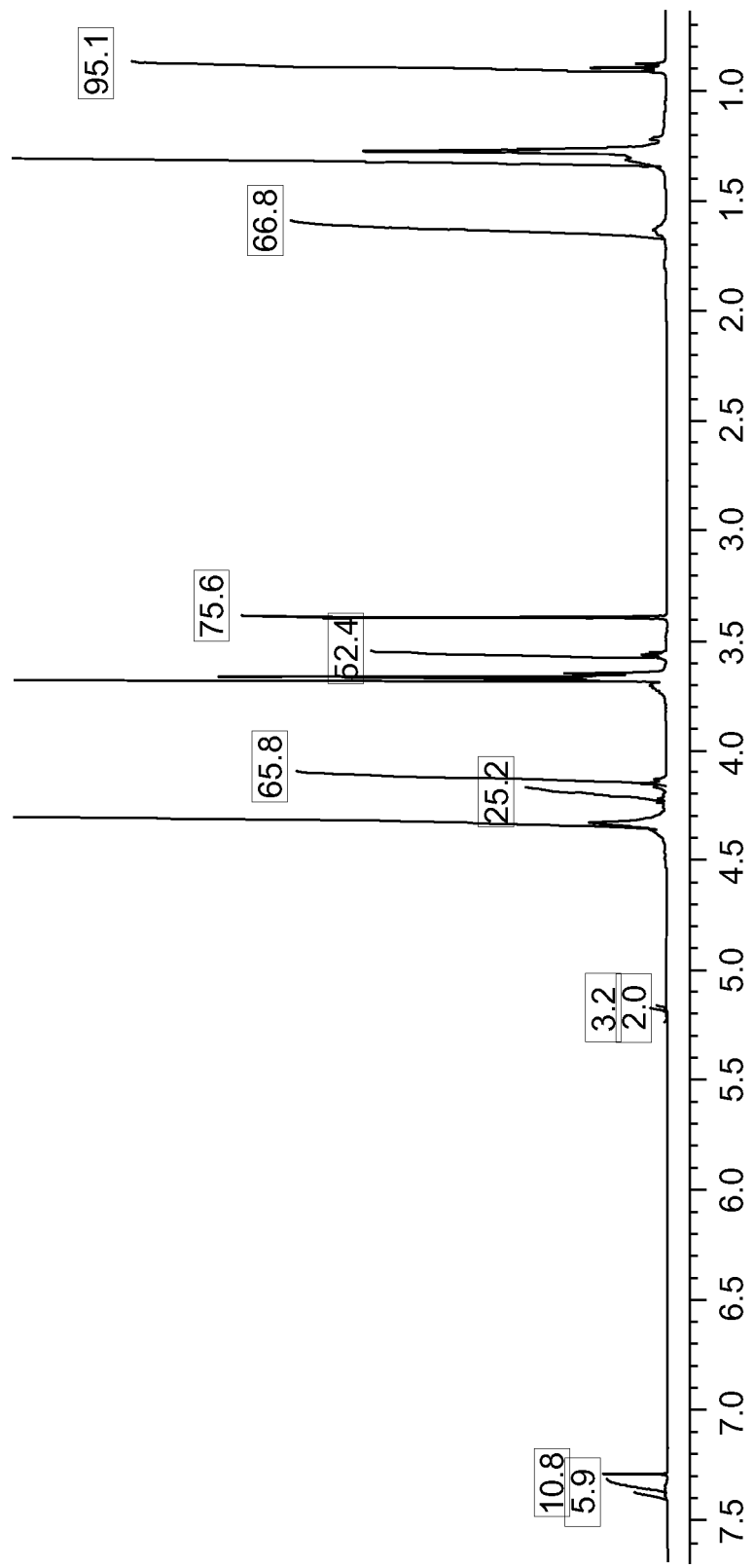
FIG. 3 is a $^1$H-NMR (CDCl$_3$) spectrum of TRC(PEG350)$_{10,30,30}$.
Figure 4:
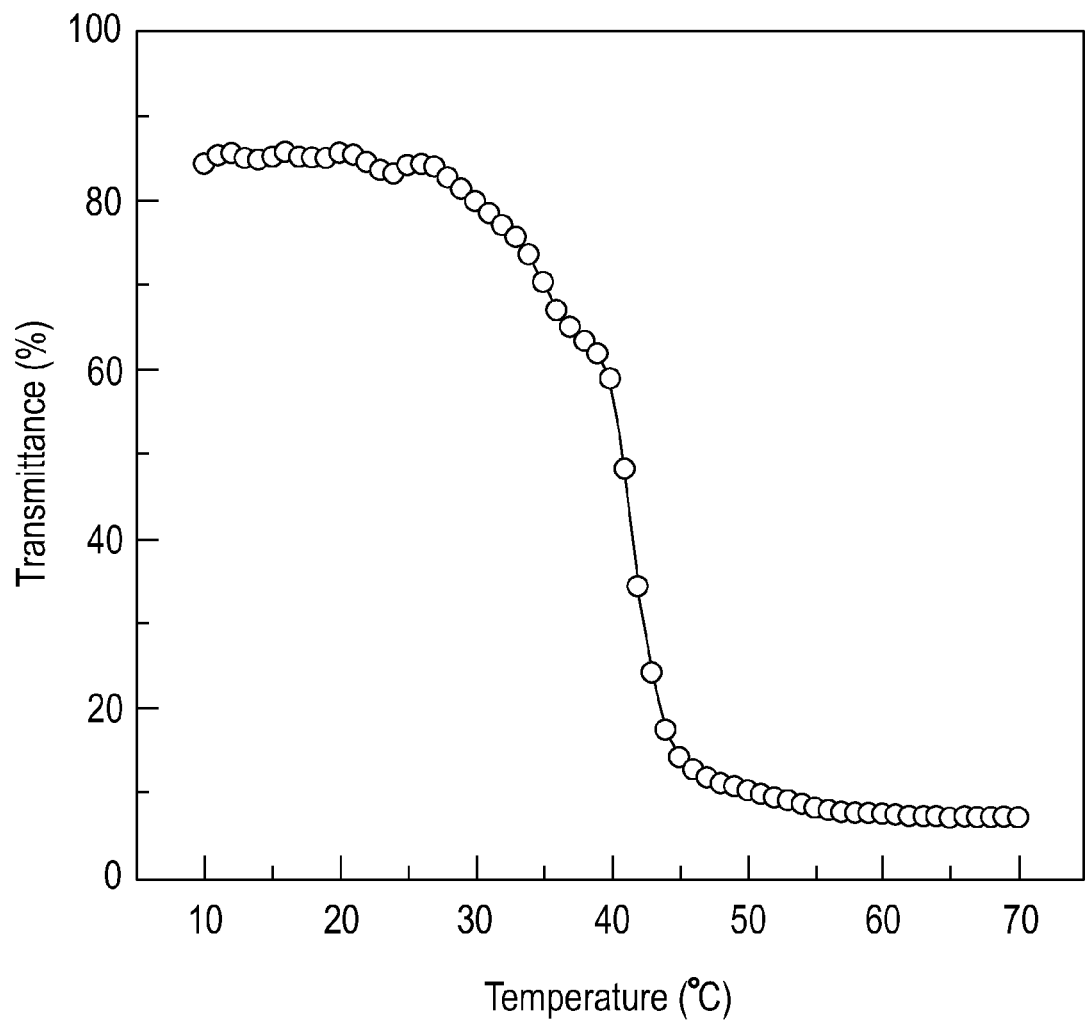
FIG. 4 is a graph of the luminous transmittance measurement at 500 nm for TRC(PEG350)$_{10,30,30}$ in water (1 mg/1 mL) as a function of temperature.

Preparation of Thermoresponsive Polycarbonate, TRC(PEG$_{350}$)$_{10,30,30}$ with Degree of Polymerizations (DPs) of 10, 30, 30 for MTC-C2, MTC-PEG$_{550}$, and MTC-C12, Respectively Thermoresponsive polycarbonate (TRC$_{a, b, c}$) block copolymers with degree of polymerizations (DPs) of a, b, c for MTC-C2, MTC-PEG$_{350}$, and MTC-C12, respectively, were prepared from a series of two ring opening polymerizations (ROP): (i) ROP of MTC-C2, and then (ii) ROP of a mixture of MTC-PEG$_{550}$ and MTC-C12. First, benzyl alcohol (10 mg, 93 µmol) and sparteine (22 mg, 94 µmol) were dissolved in CH$_2$Cl$_2$ (0.5 mL). MTC-C2 (0.17 g, 0.90 mmol) and thiourea catalyst (35 mg, 95 µmol) were added to the solution, and the mixture was polymerized at room temperature for 1 day in a glove box. At the end of the first polymerization monitored by NMR spectroscopy, MTC-PEG$_{350}$ (1.97 g, 2.8 mmol), and MTC-C12 (0.91 g, 2.8 mmol), and additional TU/sparteine (2.5~5.0 mol %) catalysts dissolved in CH$_2$Cl$_2$ (1.5 mL) were added. The polymerization proceeded at room temperature for 2 days in a glove box. At the end of reaction, an excess of benzoic acid was added to deactivate the catalyst, and the CH$_2$Cl$_2$ was removed by evaporation. The product polymer was purified by dialysis (MWCO=1,000) in CH$_3$OH for 1 day and then dried under vacuum to give yellowish viscous liquid. Yield: ~50%, M$_n$ (NMR)=35,100 g/mol, PDI (GPC in THF, FIG. 2)=1.15. $^1$H-NMR (400 MHz in CDCl$_3$, FIG. 3):=7.45-7.30 (m, Ph initiator), 5.08 (s, Ph-CH$_2$ initiator), 4.30-4.15 (br, OCOOCH$_2$ polymer of MTC-Et, MTC-PEG, MTC-C12), 4.10 (q, OCH$_2$CH$_3$ polymer of MTC-Et), 4.06-4.02 (t, OCH$_2$CH$_2$(CH$_2$)$_9$CH$_3$ polymer of MTC-C12), Et-CH$_2$OCOOCH$_2$CCH$_3$—), 4.38-4.36 (t, 2H, PEG-CH$_2$CH$_2$—OCO), 4.22-4.20 (d, 4H, —CH$_2$OCOOCH$_2$CCH$_3$—), 3.65 (m, 4H, OCH$_2$CH$_2$ polymer of MTC-PEG), 3.38 (s, 3H, OCH$_2$CH$_2$OCH$_3$ polymer of MTC-PEG), 1.55 (br, 2H, OCH$_2$CH$_2$(CH$_2$)$_9$CH$_3$ polymer of MTC-C12 and 3H, OCH$_2$CH$_3$ polymer of MTC-Et), 1.40-1.20 (br, 18H, OCH$_2$CH$_2$(CH$_2$)$_9$CH$_3$ polymer of MTC-C12 and OCOOCH$_2$CCH$_3$CH$_2$ polymer of MTC-Et, MTC-PEG, MTC-C12), 0.82-0.79 (t, 3H, OCH$_2$CH$_2$(CH$_2$)$_9$CH$_3$ polymer of MTC-C12). FIG. 4 is a graph showing the luminous transmittance at 500 nm for TRC (PEG=350)$_{10,30,30}$ in water (1 mg/1 mL) as a function of temperature. The luminous transmittance begins falling at about 25° C., steeply falling from 35° C. to 45° C., thus evidencing the LCST transition for this material. The temperature was step-wise increased by every 1~2° C.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The foregoing description of the embodiments of this invention has been presented for purposes of illustration and description. It is not intended to be exhaustive or to limit the invention to the precise form disclosed, and many modifications and variations are possible. Such modifications and variations that may be apparent to a person skilled in the art are intended to be included within the scope of this invention as defined by the accompanying claims.

What is claimed is:

1. A method of preparing a block copolymer, by sequentially forming a hydrophilic block and a hydrophobic block of the block copolymer, wherein the hydrophilic block and the hydrophobic block each comprise repeating units derived by ring opening polymerization of one or more cyclic carbonate monomers, wherein the hydrophobic block comprises repeating units derived from an ethyl ester of 2-ethoxycarbonyl-2-methyltrimethylene carbonate (MTC-C2) and the hydrophilic block comprises repeating units derived from a first monomer of the formula (IX),

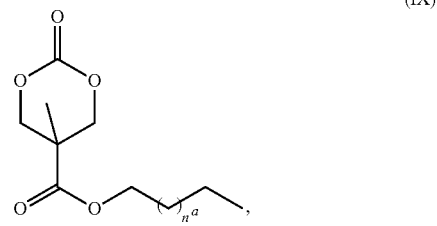

(IX)

wherein n$^a$ is an integer from 1 to 25.

2. The method of claim 1, wherein the ring opening polymerization is catalyzed by an organic catalyst.

3. A method comprising treating an aqueous mixture of a block copolymer with an agent to form a self-assembled nanostructure containing the block copolymer and the agent, wherein the block copolymer comprises a hydrophobic block and a hydrophilic block, the hydrophobic block and the hydrophilic block each comprising repeating units derived from ring opening polymerization of one or more cyclic carbonate monomers, wherein the hydrophobic block comprises repeating units derived from an ethyl ester of 2-ethoxycarbonyl-2-methyltrimethylene carbonate (MTC-C2) and the hydrophilic block comprises repeating units derived from a first monomer of the formula (IX),

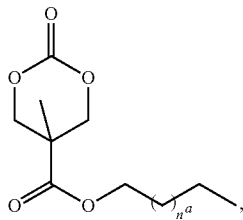

(IX)

wherein $n^a$ is an integer from 1 to 25.

4. The method of claim 1, wherein the hydrophilic block further comprises a second monomer of the formula (X),

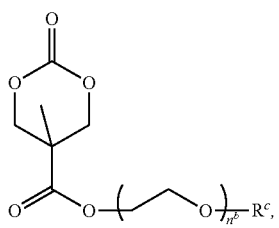

(X)

wherein $n^b$ is an integer from 1 to 25, and $R^C$ is a alkyl group comprising 1 to 20 carbons.

5. The method of claim 3, wherein the hydrophilic block further comprises a second monomer of the formula (X),

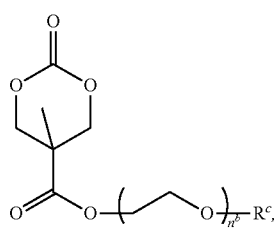

(X)

wherein $n^b$ is an integer from 1 to 25, and $R^C$ is a alkyl group comprising 1 to 20 carbons.

\* \* \* \* \*